United States Patent
Sinkov

(10) Patent No.: US 9,754,464 B1
(45) Date of Patent: Sep. 5, 2017

(54) HAPTIC COMMUNICATIONS

(71) Applicant: Evernote Corporation, Redwood City, CA (US)

(72) Inventor: Andrew Sinkov, San Francisco, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 15/132,531

(22) Filed: Apr. 19, 2016

Related U.S. Application Data

(60) Provisional application No. 62/153,110, filed on Apr. 27, 2015.

(51) Int. Cl.

| | |
|---|---|
| *G08B 6/00* | (2006.01) |
| *G06F 3/01* | (2006.01) |
| *G06F 3/0485* | (2013.01) |
| *G06F 3/0488* | (2013.01) |
| *G06F 1/16* | (2006.01) |
| *H04W 4/12* | (2009.01) |

(52) U.S. Cl.
CPC ............... *G08B 6/00* (2013.01); *G06F 1/163* (2013.01); *G06F 1/1662* (2013.01); *G06F 3/016* (2013.01); *G06F 3/0485* (2013.01); *G06F 3/04883* (2013.01); *H04W 4/12* (2013.01)

(58) Field of Classification Search
CPC .... G06F 3/016; G06F 3/0485; G06F 3/04883; G06F 1/163; G06F 1/1662; G08B 6/00; H04W 4/12
See application file for complete search history.

(56) References Cited

U.S. PATENT DOCUMENTS

| | | | |
|---|---|---|---|
| 2012/0070805 A1* | 3/2012 | Wong | G09B 21/005 434/114 |
| 2015/0318874 A1* | 11/2015 | Donaldson | H04B 11/00 367/135 |

\* cited by examiner

*Primary Examiner* — Leon Flores
(74) *Attorney, Agent, or Firm* — Morgan, Lewis & Bockius LLP

(57) ABSTRACT

Providing haptic communications includes attaching to skin of a user a haptic device that produces touch impulses, electronically transmitting a message to the haptic device, converting the message to touch impulses, and providing the touch impulses to the user. Messages may be converted to touch impulses using coding from the Braille system or Morse code. Messages may be converted to touch impulses using Braille coding where the touch impulses are provided by a positional matrix that is part of the device. Messages may be converted to touch impulses using Morse coding where a Morse code dot is provided by a brief touch and where a Morse code dash is provided by a longer touch. The haptic device may be a patch or a sticker attached to the user with a biocompatible adhesive. The haptic device may notify the user of receipt of a new message using special touch symbols.

36 Claims, 5 Drawing Sheets

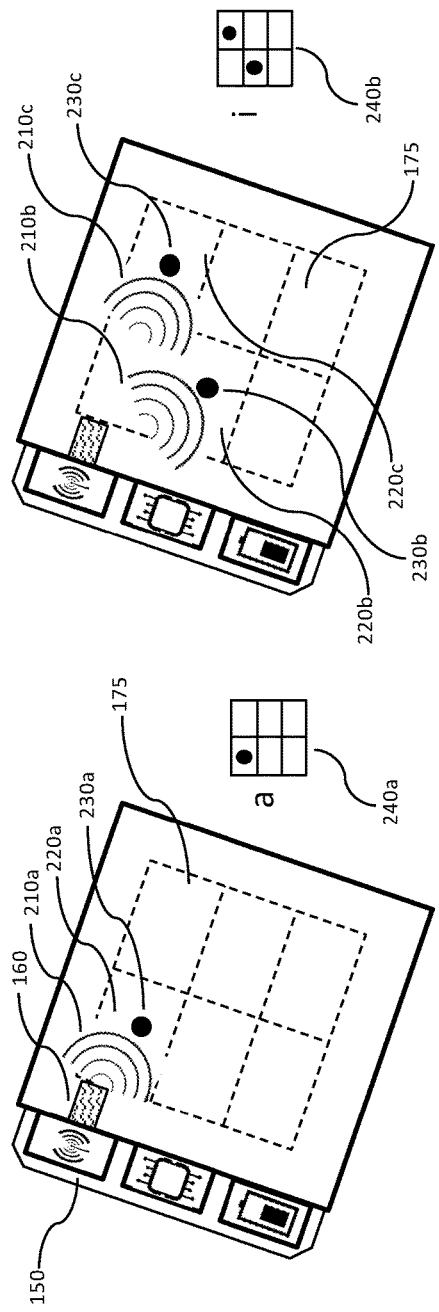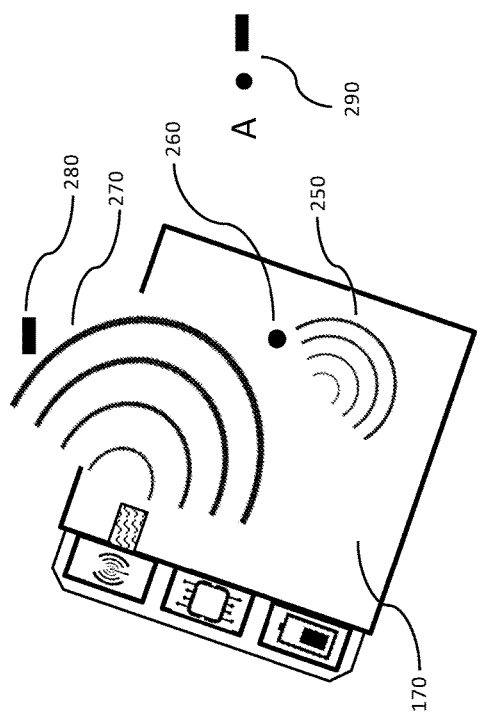

HAPTIC COMMUNICATIONS

CROSS-REFERENCE TO RELATED APPLICATIONS

This application claims priority to U.S. Prov. App. No. 62/153,110, filed on Apr. 27, 2015, and entitled "HAPTIC COMMUNICATIONS METHOD AND DEVICE", which is incorporated herein by reference.

TECHNICAL FIELD

This application is directed to the field of human-machine interaction on wearable devices, and more particularly to the field of communicating with a user of a device with emulated tactile input and presentation of tactile information on such devices.

BACKGROUND OF THE INVENTION

The next wave of mobile computing is broadly associated with wearable computers, such as smart wristbands, smart watches and glasses, and other head-mounted cameras and displays, intelligent and adaptable clothing, wearable medical devices, etc. In 2015, shipments of wearable devices have exceeded 79M units. The current market of wearable devices is dominated by smart watches and smart bands (wrist band, arm band, head band activity trackers). According to market forecasts, about 110 million wearable devices will be shipped in 2016, and by 2020, annual shipments will exceed 237 million units. Wrist-worn devices, such as wristbands for activity tracking and medical purpose and smart watches, are expected to retain a high share of the early wearables market. Some analysts project a market share of wrist-worn wearables to reach 87% of all wearable shipments in 2018.

An important feature of many wearable computers is their increased ability to sense, measure and direct a physical and/or emotional condition of a user and pace of user activities. According to commonly accepted terminology, multiple wearable devices of an individual form a Body Area Network (BAN, also known as a wireless body area network WBAN or a body sensor network BSN). Devices in such network may be surface-mounted on the body in a fixed position, may be accompanied by devices which users may carry in different positions, in pockets of their clothes, by hand or in various bags; future wearable devices may even be embedded inside the body as implants. In many forecasts, an early phase of BANs is characterized by smartphone centric networks; wearable devices at this phase may be perceived as smartphone companions, communicating with other networks via a smartphone gateway, while intra-network communications between multiple wearable devices may be served by short-range wireless technologies, such as Bluetooth and NFC (Near Field Communication).

A significant portion of existing and forecasted wearable devices is designed for permanent contact with the human skin; therefore, significant research, development and commercial efforts are directed towards enhancing and optimizing device interaction with the skin. These efforts resulted in several well-received mass-market products and give rise to emerging trends:

Fingerprint scanners are a well-developed commercial market.

A new area of experimental and commercial research deals with skin conductivity for signal transmission, resulting in intra-body communications, amplifying data transmission within BANs and opening a new approach in inter-connecting various conventional devices, such as a music player and a headset.

New stretchable, flexible and visually customizable touch sensors offer an opportunity of a skin-worn touch sensitive interface in the form of touch input stickers for controlling various wearable and mobile devices, attached to the skin with a biocompatible adhesive.

For visually impaired people, touch has long been a conduit for data acquisition and communications, for example, Braille alphabet, Braille reading and books, as well as Braille printers and evolving Braille displays. There is also significant development in creating an artificial skin for prosthetic purposes.

Notwithstanding significant progress and promising new developments in utilizing skin surface and its physical and physiological properties in the context of wearable devices and personal body networks, various application areas still remain disconnected.

Accordingly, it is desirable to design a new system, methods, devices, and user interfaces for haptic communications.

SUMMARY OF THE INVENTION

According to the system described herein, providing haptic communications includes attaching to skin of a user a haptic device that produces touch impulses, electronically transmitting a message to the haptic device, converting the message to touch impulses, and providing the touch impulses to the user. Messages may be converted to touch impulses using coding from the Braille system or Morse code. Messages may be converted to touch impulses using Braille coding where the touch impulses are provided by a positional matrix that is part of the device. Messages may be converted to touch impulses using Morse coding where a Morse code dot is provided by a brief touch and where a Morse code dash is provided by a longer touch. The haptic device may be a patch or a sticker attached to the user with a biocompatible adhesive. The haptic device may notify the user of receipt of a new message using special touch symbols. The haptic device may store the message. The user may manage a queue of stored messages by scrolling through the stored messages and deleting at least some of the stored messages. The message that is stored by the haptic device may be replayed to the user using the touch impulses. The user may request a replay using a haptic gesture that is accepted by the device. The message that is electronically transmitted may be a text message. The haptic device may confirm receipt of the message to a sender. The haptic device may be controlled by an other device, such as a smartphone. The device may include an integrated keyboard. The user may reply to the message using the integrated keyboard. A cloud service may be used to relay the message from a sender to the user. The cloud service may relay replies by the user to the sender.

According further to the system described herein, a non-transitory computer-readable medium contains software that provides haptic communications. The software includes executable code that receives a message electronically transmitted to a haptic device attached to skin of a user and executable code that converts the message to touch impulses on the haptic device that are provided to the user. Messages may be converted to touch impulses using coding from the Braille system or Morse code. Messages may be converted to touch impulses using Braille coding where the touch impulses are provided by a positional matrix that is part of the device. Messages may be converted to touch impulses using Morse coding where a Morse code dot is provided by a brief touch and where a Morse code dash is provided by a longer touch. The haptic device may be a patch or a sticker attached to the user with a biocompatible adhesive. The haptic device may notify the user of receipt of a new message using special touch symbols. The haptic device may store the message. The user may manage a queue of stored messages by scrolling through the stored messages and deleting at least some of the stored messages. The message that is stored by the haptic device may be replayed to the user using the touch impulses. The user may request a replay using a haptic gesture that is accepted by the device. The message that is electronically transmitted may be a text message. The haptic device may confirm receipt of the message to a sender. The haptic device may be controlled by an other device, such as a smartphone. The device may include an integrated keyboard. The user may reply to the message using the integrated keyboard. A cloud service may be used to relay the message from a sender to the user. The cloud service may relay replies by the user to the sender.

The proposed system enables haptic communications via a touch emulating device attached to skin of a user and capable of receiving and, optionally, responding to messages (or confirming message receipt); the device may replay received messages in a haptic-friendly alphabet emulating symbols of the system via a sequence of emulated touches recognized by a trained user.

A haptic communications device may be designed as a patch or a sticker attached to skin of a user. The device may be a haptic emulator that produces touch impulses sensed and deciphered by the user. An audience-friendly character of haptic messages, which do not generate visual or audio signals that may be distractive for the recipient or others, makes haptic communications a valuable additional and private input channel for various scenarios and environments, such as a business meeting, a concert hall, a public speech, etc. At the same time, due to potential limitations to user recognition capabilities, haptic communications may be limited to short messages with a possible broad use of abbreviations (as, for example, are employed in the Grade 2 and Grade 3 Braille system).

An advanced haptic communications device (hereinafter referred to as HCODE) may include, in addition to a haptic emulator with a bus through which emulated haptic signals are transmitted to the surface of the device, a power source, a chipset with certain computing capabilities and a wireless communications capability, and a control, a feedback and/or a reply. Such advanced HCODEs may completely control receiving and replaying of haptic messages and responding to such messages, with additional features of message stack management, scheduling, etc. Another scenario may include a basic HCODE with a symbol-by-symbol receiving and replay capability controlled by another mobile or wearable device (a master device) capable of running haptic communications software, such as a smartphone or a smart watch. The master device, in its turn, may receive messages designated for haptic replay from a dedicated cloud service.

Alphabets for haptic communications may borrow from various transmission and communication areas. For example, a Braille alphabet may require a passive positional sensing by a skin area where the HCODE is applied; thus, a Braille letter "I" may be represented by three simultaneous touches in a straight line, while for a letter "o" may be represented by a middle touch shifted to the right from a line defined by two other touches. Other alphabets, such as a Morse code, may also be used; for example, a Morse dot may be represented by a brief and a relatively weak emulated touch, while a dash may be a longer and stronger touch, following a previous dot or dash with a fixed time interval, different for intra-letter and intra-word dot-dash combinations.

Feedback and reply instruments of a HCODE may vary from a basic input capability (for example, a touch sensitive outer surface of a device that may recognize several single touch or multi-touch gestures for basic control and communication features) to embedded keyboards, such as an integrated T9 touch panel.

Messages transmitted to HCODEs may be queued in the event a recipient is unable to pay instant attention to a newest message. A variety of queuing conventions may be employed: A message may be deferred and put at the bottom of a queue or may stay at the top of the message stack;

An HCODE may reject a receipt of a new message depending on the length of the queue (for example, allow no more than two haptic messages in a queue);

Various user options for managing the message queue may be offered.

A dedicated portion of a haptic message, for example, at the beginning of a message, may serve as a sender identifier; another dedicated portion may indicate message length (e.g. short, medium, long) and urgency, etc. It may be possible for a recipient to provide feedback to the HCODE (for example, via a dedicated positional touch or a multi-touch gesture) in order to continue, defer or reject an incoming haptic message depending on a sender, length, urgency and other parameters provided to the system.

A workflow for haptic communications may include the following steps and features, some of which may be optional:

1. A sender generates a short text message on a conventional device, such as a computer, a tablet or a smartphone, and sends the message to one or more recipients registered for haptic communications and possessing HCODEs.
2. Depending on a type of HCODE registered with a particular recipient, the message may arrive directly to an HCODE or to a master mobile device, such as a smartphone or a tablet, as explained elsewhere herein. In the latter case, the master device communicates with an HCODE and delivers the message via available wireless connections, such as a Bluetooth connection.
3. An HCODE receives a message and, in different scenarios, may either notify a user via a special touch symbol (a dedicated touch) that a new haptic message has arrived or may start directly reproducing a message, symbol by symbol.
4. Depending on control capabilities of a user for a particular HCODE, the user may be able to accept or defer a reproduction of a message and may be able to request a replay of a message in the event the user was unable to decipher or remember the message on the first play. For example, an HCODE may be supplied with a basic touch panel recognizing several touch or multi-touch gestures made by the user, as explained elsewhere herein. Thus, a single tap after a notification of arrival of a new haptic message may confirm a request to instantly play the message while a double-tap may defer a play until the user makes another single tap at a later time.
5. A user may elect to respond to a haptic message if the HCODE has an advanced input capability; alternatively, the user may confirm receipt (and/or receipt+ reading) of the message, for example, by employing a dedicated gesture on a HCODE touch enabled surface for notifying the sender.

6. In some scenarios, users may be able to manage a message queue accumulated in memory of their HCODE, including, but not limited to, scrolling to a next/previous haptic message, deleting messages or the whole queue, etc. Such advanced capabilities may utilize, for example, multi-touch gestures on a touch sensitive outer surface of an HCODE or a built-in mini-keyboard with touch or other input.

BRIEF DESCRIPTION OF THE DRAWINGS

Embodiments of the system described herein will now be explained in more detail in accordance with the figures of the drawings, which are briefly described as follows.

FIGS. 2A-2C schematically illustrate functioning of a haptic communication device with two haptic-friendly alphabets, Braille and Morse alphabets, according to an embodiment of the system described herein.

DETAILED DESCRIPTION OF VARIOUS EMBODIMENTS

The system described herein provides a mechanism for haptic communications via a dedicated device mounted on skin of a user, for example, on a forearm, by emulating skin touches replaying arriving messages in a given alphabet.

Figure 1A:
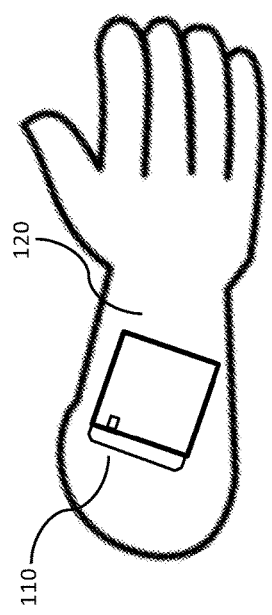
FIGS. 1A-1B are schematic illustrations of a general view and an assembly of a haptic communications device, according to an embodiment of the system described herein.
Figure 1B:
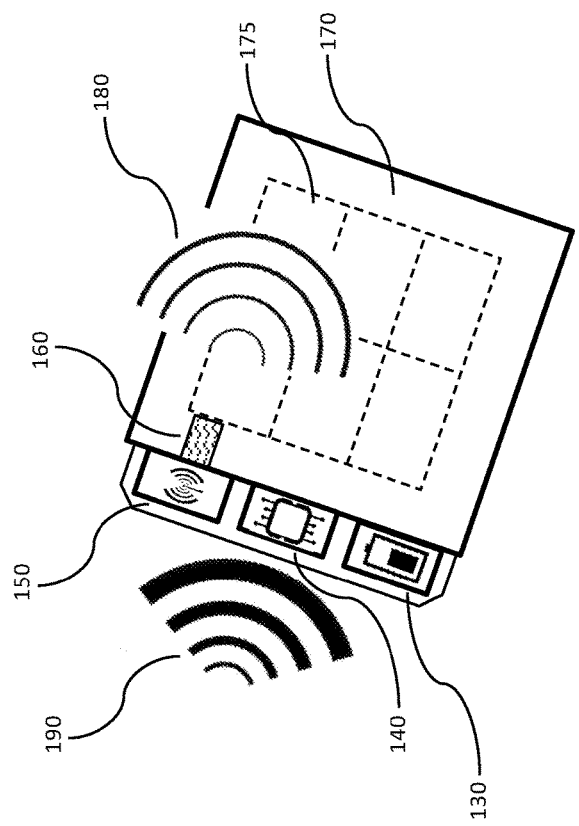

FIGS. 1A-1B are schematic illustrations of a general view and an assembly of a haptic communications device. An HCODE 110 mounted on a forearm 120 (FIG. 1A) of a user includes parts and features illustrated in FIG. 1B: a power source 130; a chipset 140 with computing capabilities, storage and wireless capabilities; a haptic emulator 150; a bus 160 transferring haptic signals to a device surface 170, which may have, in embodiments, a positional matrix 175. Emulated haptic signals 180 may be applied at any position on the surface 170, including any cell of the positional matrix 175. Incoming messages may arrive via wireless Internet connections 190.

FIGS. 2A-2C schematically illustrate functioning of the HCODE 110 of FIG. 1 with two haptic-friendly alphabets, Braille and Morse alphabets. In FIG. 2A, the HCODE replays for the user a Braille letter 'a', represented by a dot in a top left cell of a 3×2 Braille grid. The haptic emulator 150 generates a signal 210a and transmits the signal 210a over the bus 160 to a cell 220a of the positional matrix 175 where the touch of skin of the user is generated in the center of the cell 220a and is interpreted by the user as a dot 230a, corresponding to a Braille letter 'a', as shown in a Braille grid 240a.

In FIG. 2B, the HCODE replays for the user a Braille letter 'b', represented by two dots in middle left and top right positions of a Braille grid. Two signals 210b, 210c are generated and applied in a center of cells 220b, 220c of the positional matrix 175, where two touches of the skin of the user are generated and are interpreted by the user as two dots 230b, 230c, corresponding to a Braille letter 'b' depicted on the Braille grid 240b.

In FIG. 2C, the HCODE replays for the user a Morse letter 'A', which is represented as a single dot—single dash two-symbol sequence 290. First, a signal 250 is generated and reproduced anywhere on the surface 170 of the HCODE as a brief touch 260 emulating a dot. Next, a stronger signal 270 is generated and is applied as a stronger touch of the skin of the user for a longer time (e.g. three times longer than the dot-signal). Accordingly, the user deciphers from touches the dot+dash combination corresponding to the Morse letter A.

Figure 3:
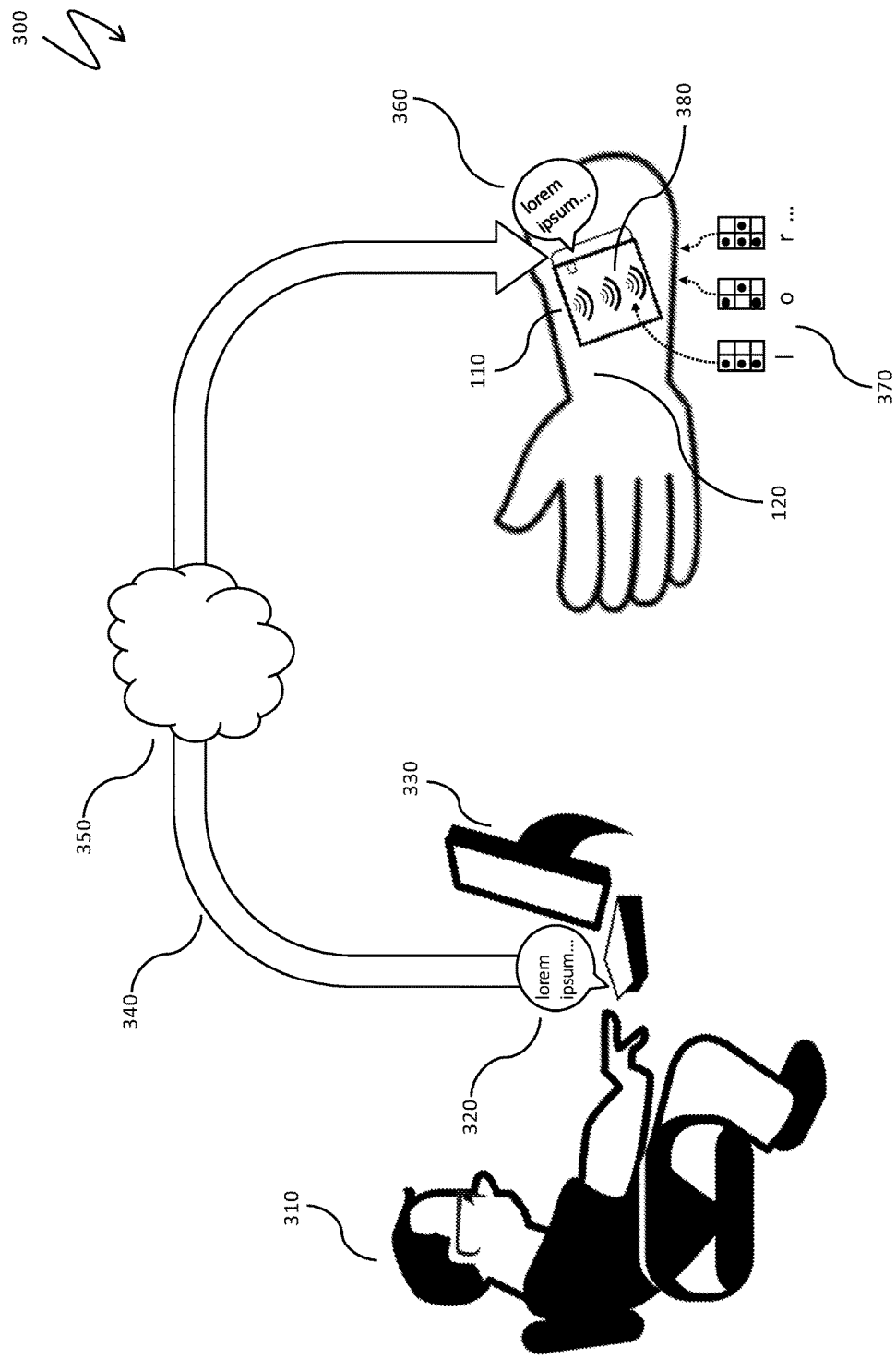
FIG. 3 is a schematic illustration of creation, transmission and replay of a haptic message, according to an embodiment of the system described herein.

FIG. 3 is a schematic illustration 300 of creation, transmission and replay of a haptic message. A sender 310 types a short text message 320 on a computing device 330, which may be a desktop or a laptop computer, a tablet, a mobile phone, a wearable device, etc. Message length may be limited by the system, as takes place in SMS and other messaging systems; for example, messages longer than 20 symbols may be rejected with a requirement to shorten the messages. The message is transmitted via an Internet connection 340 to a cloud service 350 for subsequent delivery to a recipient—an owner of the HCODE 110 attached, in this example, to the forearm 120 of the recipient. The incoming message 360 may be stored in a memory of the HCODE 110 and subsequently replayed as a sequence of symbols 370, emulated by an illustrative sequence of haptic signals 380; alternatively, the message 360 may be replayed instantly, as explained elsewhere herein. In some embodiments, direct connections between the sender and the recipient may be employed—for example, a peer-to-peer Bluetooth connection when the sender and the recipient are located in proximity to each other.

Figure 4:
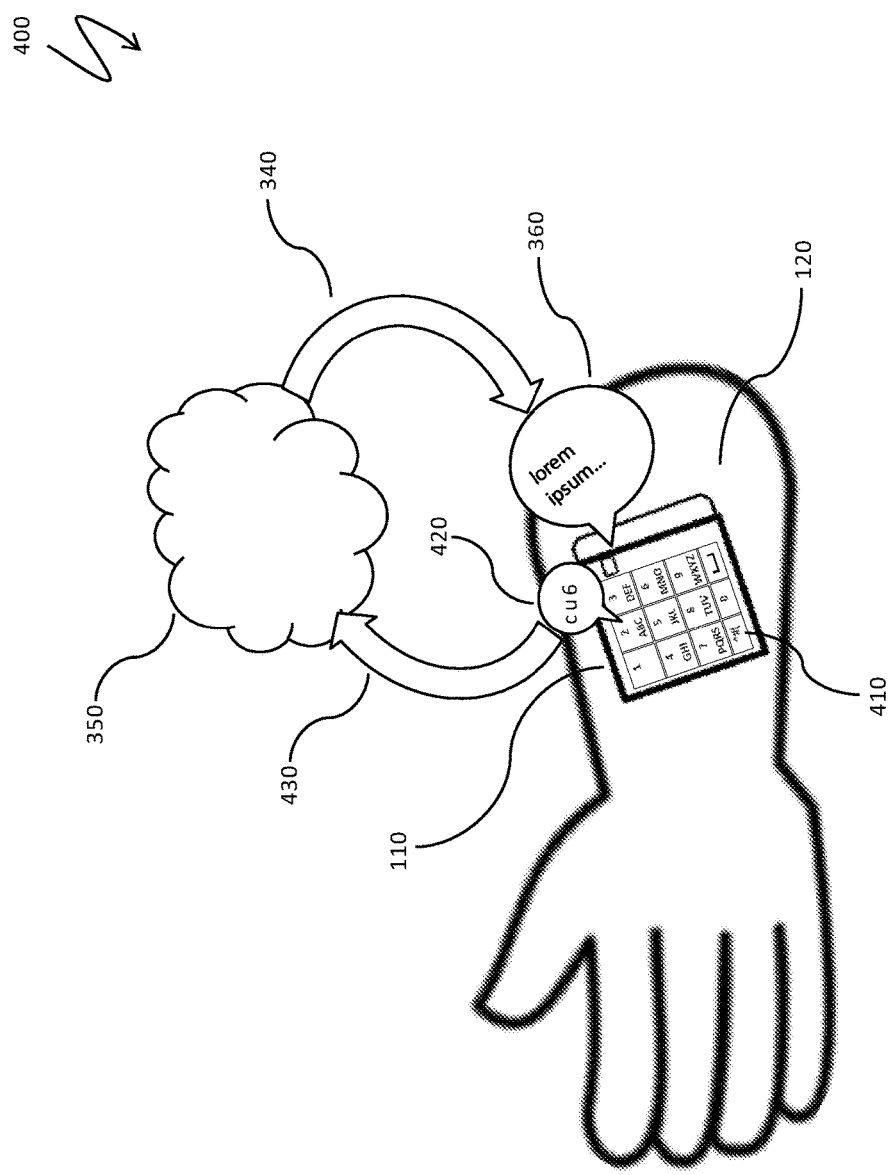
FIG. 4 is a schematic illustration of a haptic communications device with an integrated reply capability, according to an embodiment of the system described herein.

FIG. 4 is a schematic illustration 400 of a haptic communications device with an integrated reply capability. The HCODE 110 mounted on the forearm 120 of the user is supplied with an integrated T9 keyboard 410, which may be touch or button operated. In response to an incoming and replayed text message 360 (see FIG. 3 and the accompanying text), which arrives over an Internet connection 340 from a cloud service 350 (other types of connections and message transmission are explained elsewhere herein, in particular, in conjunction with FIG. 3), the user may type a short reply 420 on the keyboard 410. In the example of FIG. 4, a three-symbol message 420 abbreviates in a commonly acceptable manner a phrase "see you at 6". Subsequently, the reply 420 is transmitted over a wireless connection 430 available on the HCODE 110 (see, for example, FIG. 1B and the accompanying text) back to the cloud service 350 for delivery to a recipient of the reply 420, i.e. to the sender of the message 360.

Figure 5:
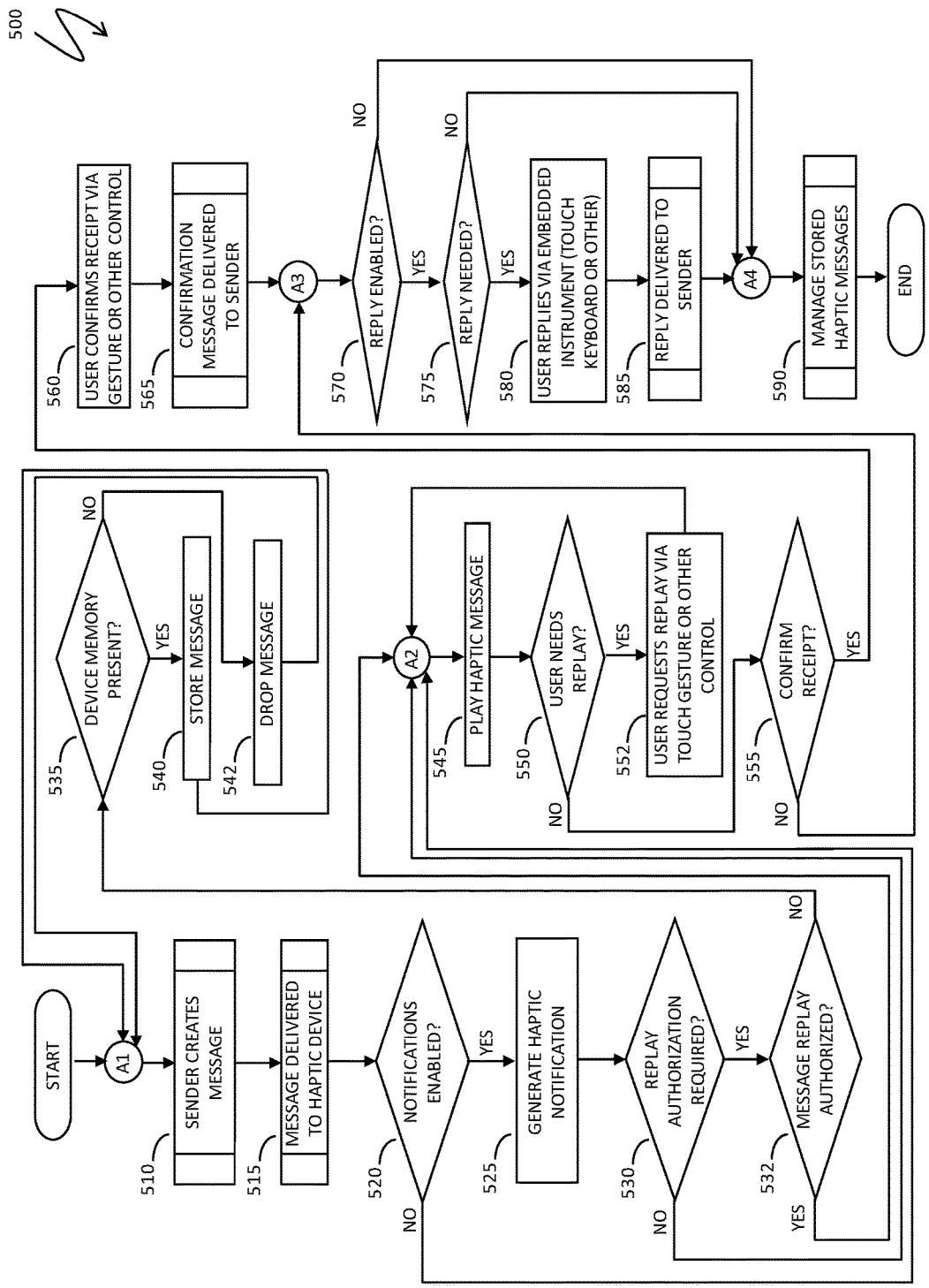
FIG. 5 is a system flow diagram illustrating system functioning, according to an embodiment of the system described herein.

Referring to FIG. 5, a system flow diagram 500 illustrates processing in connection with the system described herein. Processing begins at a step 510, where a sender creates a new message for a delivery to an HCODE, as explained elsewhere herein (see, in particular, FIG. 3 and the accompanying text). After the step 510, processing proceeds to a step 515, where the message is delivered to the HCODE. After the step 515, processing proceeds to a test step 520, where it is determined whether user notifications on the HCODE are enabled. If so, processing proceeds to a step 525, where the system generates and plays a haptic notification. After the step 525, processing proceeds to a test step 530, where it is determined whether message replay authorization is required. If so, processing to a test step 532, where it is determined whether the message replay is authorized by the user. If not, processing proceeds to a test step 535, where it is determined whether the HCODE has a memory. If so, processing proceeds to a step 540, where the message is stored in the HCODE memory. After the step 540 processing proceeds back to the step 510.

If it was determined at the test step 535 that the HCODE does not have a memory, processing proceeds from the test step 535 to a step 542, where the message is dropped (since replay of the message has not been authorized by the user and there is no storage capability for messages). After the step 540 processing proceeds back to the step 510.

If it was either determined at the test step 520 that notifications are not enabled; or it was determined at the test step 530 that replay authorization is not required; or it was determined at the test step 532 that message replay is authorized, processing proceeds from one of the steps 520, 530, 532 to a step 545, where the HCODE plays the haptic message to the user, as explained elsewhere herein (see, in particular, FIGS. 2A-2C and the accompanying text). After the step 545, processing proceeds to a test step 550, where it is determined whether the user needs a replay of the message. If so, processing proceeds to a step 552, where the user requests a replay via a touch gesture or other control, as explained elsewhere herein. After the step 552, processing proceeds back to the step 545.

If it was determined at the test step 550 that the user did not need a message replay, processing proceeds from the test step 550 to a test step 555, where it is determined whether a confirmation of the message receipt is needed. If so, processing proceeds to a step 560, where the user confirms message receipt via a touch gesture or other control, as explained elsewhere herein. After the step 560, processing proceeds to a step 565, where the confirmation message is delivered to the sender. After the step 565, processing proceeds to a test step 570, where it is determined whether a reply option exists and if the reply feature is enabled. (Note that the test step 570 may be independently reached from the test step 555 in case the confirmation receipt is not needed.) If it is determined at the step 570 that the reply option exists and is enabled, processing proceeds to a test step 575, where it is determined whether the reply is needed for the particular received message. If so, processing proceeds from the step 570 to a step 580 where the user replies from the HCODE via an embedded input instrument, such as a touch or button operated keyboard or other instrument (see, in particular, FIG. 4 and the accompanying text). In some embodiments, the user may also be able to respond to a haptic message received on the HCODE from a smartphone, tablet, computer or other wearable device. After the step 580, processing proceeds to a step 585, where the reply is delivered to the sender of the original message, as explained elsewhere herein including FIG. 4 and the accompanying text. After the step 585, processing proceeds to an optional step 590, where the user manages stored haptic messages on the HCODE. The step 590 may be employed only for HCODE systems with memory functionality. Note that the step 590 may be independently reached from the test step 570 if it was determined at the step 570 that the reply option does not exist or the reply has not been enabled; the step 590 may also be independently reached from the test step 575 if it was determined at the step 575 that the reply is not needed. After the step 590, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. A smartphone functioning as a master device may include software that is pre-loaded with the device, installed from an app store, installed from a desktop (after possibly being pre-loaded thereon), installed from media such as a CD, DVD, etc., and/or downloaded from a Web site. Such a smartphone may use an operating system selected from the group consisting of: iOS, Android OS, Windows Phone OS, Blackberry OS and mobile versions of Linux OS. An HCODE may be connected by various types of wireless and other connections, such as cellular connections in Wide Area Networks, Wi-Fi, Bluetooth, NFC, USB, infrared, ultrasound and other types of connections. A mobile device other than a smartphone may be used as a master device.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing haptic communications, comprising:
   attaching a haptic device to skin of a user using a biocompatible adhesive such that a device surface of the haptic device comes into contact with the skin of the user, the haptic device including a chipset having computing, storage and wireless capabilities, a haptic emulator, and the device surface that is coupled to the haptic emulator and configured to transmit a haptic effect;
   electronically receiving a message by the haptic device;
   converting the message to touch impulses at least by the haptic emulator; and
   applying the touch impulses onto the skin of the user via the device surface.

2. The method of claim 1, wherein the message is converted to the touch impulses in accordance with one of: Braille coding and Morse coding.

3. The method of claim 2, wherein the message is converted to the touch impulses using Braille coding and wherein the touch impulses are provided by a positional matrix that is part of the haptic device.

4. The method of claim 2, wherein the message is converted to the touch impulses using Morse coding and wherein a Morse code dot is provided by a brief touch and wherein a Morse code dash is provided by a longer touch.

5. The method of claim 1, wherein the haptic device is one of: a patch and a sticker attached to the user with the biocompatible adhesive.

6. The method of claim 1, wherein the haptic device notifies the user of receipt of a new message using special touch symbols.

7. The method of claim 1, wherein the haptic device has no integrated display.

8. The method of claim 1, wherein the haptic device stores the message, and the user manages a queue of stored messages by scrolling through the stored messages and deleting at least some of the stored messages.

9. The method of claim 7, wherein the message that is stored by the haptic device is replayed to the user using the touch impulses.

10. The method of claim 9, wherein the user requests a replay using a haptic gesture that is accepted by the haptic device.

11. The method of claim 1, wherein the message that is electronically transmitted includes a text message.

12. The method of claim 1, wherein the haptic device confirms receipt of the message to a sender.

13. The method of claim 1, wherein the haptic device is controlled by another device.

14. The method of claim 13, wherein the other device is a smartphone.

15. The method of claim 1, wherein the device includes an integrated keyboard allowing the user to reply to the message.

16. The method of claim 1, wherein the message is converted to a sequence of symbols each represented by a subset of the touch impulses, and the respective subset of the touch impulses associated with each symbol are applied sequentially onto the skin of the user.

17. The method of claim 1, wherein a cloud service is used to relay the message from a sender to the user.

18. The method of claim 17, wherein the cloud service relays replies by the user to the sender.

19. A haptic device, comprising:
a chipset having computing, storage and wireless capabilities;
a haptic emulator coupled to the chipset; and
a device surface coupled to the haptic emulator and configured to come into contact with skin of a user when the haptic device is attached to the skin of the user using a biocompatible adhesive;
wherein the chipset includes a non-transitory computer-readable medium storing one or more programs to be executed to enable haptic communications, the one or more programs including instructions for:
electronically obtaining a message by the haptic device;
converting the message to touch impulses by the haptic emulator; and
applying the touch impulses onto the skin of the user via the device surface.

20. The haptic device of claim 19, wherein the message is converted to the touch impulses in accordance with one of: Braille coding and Morse coding.

21. The haptic device of claim 20, wherein the message is converted to the touch impulses using Braille coding and wherein the touch impulses are provided by a positional matrix that is part of the device.

22. The haptic device of claim 20, wherein the message is converted to the touch impulses using Morse coding and wherein a Morse code dot is provided by a brief touch and wherein a Morse code dash is provided by a longer touch.

23. The haptic device of claim 19, wherein the haptic device is one of: a patch and a sticker attached to the user with the biocompatible adhesive.

24. The haptic device of claim 19, wherein the haptic device notifies the user of receipt of a new message using special touch symbols.

25. The haptic device of claim 19, wherein the haptic device has no integrated display.

26. The haptic device of claim 25, wherein the haptic device stores the message, and the user manages a queue of stored messages by scrolling through the stored messages and deleting at least some of the stored messages.

27. The haptic device of claim 25, wherein the message that is stored by the haptic device is replayed to the user using the touch impulses.

28. The haptic device of claim 27, wherein the user requests a replay using a haptic gesture that is accepted by the device.

29. The haptic device of claim 19, wherein the message that is electronically transmitted is a text message.

30. The haptic device of claim 19, wherein the haptic device confirms receipt of the message to a sender.

31. The haptic device of claim 19, wherein the haptic device is controlled by another device.

32. The haptic device of claim 31, wherein the other device is a smartphone.

33. The haptic device of claim 19, wherein the device includes an integrated keyboard.

34. The haptic device of claim 33, wherein the user replies to the message using the integrated keyboard.

35. The haptic device of claim 19, wherein a cloud service is used to relay the message from a sender to the user.

36. The haptic device of claim 35, wherein the cloud service relays replies by the user to the sender.

* * * * *